June 3, 1958   J. P. BEIJERSBERGEN   2,837,667
PIEZO-ELECTRIC QUARTZ CRYSTAL PLATE
Filed June 3, 1954
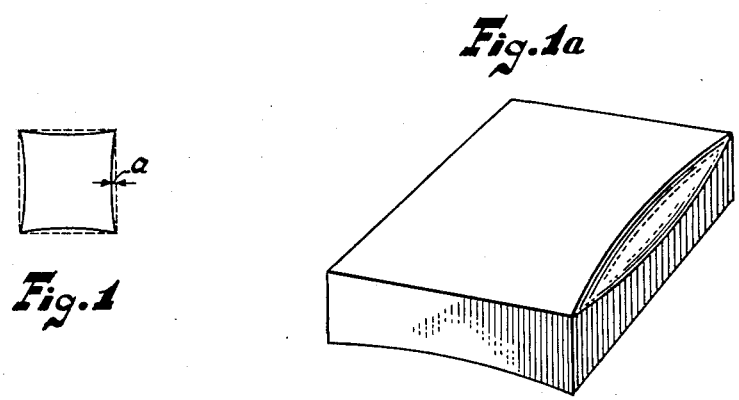
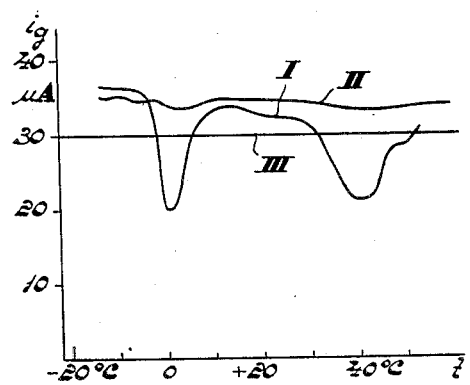
INVENTOR
JACOBUS PETRUS BEIJERSBERGEN
BY 
AGENT United States Patent Office 2,837,667
Patented June 3, 1958

2,837,667
PIEZO-ELECTRIC QUARTZ CRYSTAL PLATE

Jacobus Petrus Beijersbergen, Eindhoven, Netherlands, assignor, by mesne assignments, to North American Philips Company, Inc., New York, N. Y., a corporation of Delaware Application June 3, 1954, Serial No. 434,233

Claims priority, application Netherlands June 10, 1953

2 Claims. (Cl. 310—9.6)

The invention relates to a quadrangular piezo-electric crystal plate having dimensions such that the crystal is capable of performing thickness-shear vibrations.

One of the requirements in practice for quartz crystals is that the "activity" of the crystal should be substantially constant over a wide temperature range of for example —50° C. to +90° C., or should at least exceed a given minimum level. The "activity" may be determined by causing the crystal to oscillate in conjunction with a standard tube oscillator and by measuring the grid current of the tube.

It is found that with many of the quartz crystals of the above type which otherwise provide a satisfactory performance the "activity" curve (grid current of the oscillator tube as a function of the temperature of the crystal) exhibits one or more large dips, which render these crystals unserviceable. The amount of reject thus caused in the production may be very considerable.

According to the invention this disadvantage is substantially completely obviated, if at least one of the four sides of the peripheral boundary of the crystal plate has the shape of a concave line. Preferably all four edges are concave. It is found that owing to this shape the amount of rejects may be reduced to a few percent.

Figs. 1 and 1a show one embodiment of the invention and

Fig. 2 is a graph with reference to which the advantage obtained by the invention will be explained.

The crystal plate shown in Figs. 1 and 1a is substantially quadrangular and has an edge of, for example 12 mms. and a thickness of 0.5 mm. The cut and the dimensions of the crystal are such that upon excitation by a tube oscillator the crystal performs thickness-shear oscillations and that the dependence on temperature of the frequency produced (temperature coefficient) has an advantageous low value (this is inter alia the case with the AT- and BT-cuts).

As is evident from Fig. 1 the edge of the plate follows on all four sides a concave line, i. e., a line curved inwardly. By way of comparison the purely quadrangular shape is indicated in broken lines; the chord $a$ is of the order of 0.1 mm.

In Fig. 2 reference II designates the "activity curve" of the crystal shown in Fig. 1; this is the curve indicating the grid current $i_g$ of the oscillator tube of a test standard oscillator co-operating with the crystal, as a function of temperature $t$ of the crystal. During manufacture the crystal has initially the shape shown in broken lines in Fig. 1; the activity curve obtained by this shape is designated by I in Fig. 2. The horizontal line III indicates the level below which the activity must not drop. The figure shows that this requirement can be fulfilled only by the shape in accordance with the invention (curve II).

The effect of the invention may be accounted for by assuming that the decrease in activity is produced by the interference of overtones of other waveform, the fundamental frequencies of which are considerably lower than those of the desired waveform, for example thickness vibrations and flexural vibrations, with the desired vibrations. Since the temperature variation of the vibration modes of lower frequency differs from that of the desired vibration, the modes of vibrations will counteract one another only at definite temperatures; at the corresponding areas the activity curve will exhibit a dip.

It has been found that the activity of the vibration modes of lower frequency and of their overtones is strongly reduced by a concave shape of the edges of the crystal plate; the activity of the desired vibrations is found to be substantially unaffected by this shape. As a result, the activity errors of the crystal, as is evident from Fig. 2, can be substantially completely obviated.

Experiments have proved that by grinding only one of the edges into a concave shape an improvement is obtained; this improvement increases as more edges are ground. The number of edges that must be ground depends on the value of the activity error inherent in the purely quadrangular plate. A further improvement may sometimes be obtained by providing the edges with a facet, which is also curved, and/or by slightly rounding off the corners.

What is claimed is:

1. A quadrangular piezo electric crystal plate having two surfaces each parallel to the X-axis of the crystal and each forming an angle of less than 90° with the Z-axis whereby said plate is adapted to vibrate in the thickness-shear mode, each of said surfaces being bounded by at least one concavely curved inwardly bevelled peripheral edge.

2. The piezo-electric crystal plate of claim 1 in which at least one of the edges has a curved facet.

References Cited in the file of this patent

UNITED STATES PATENTS

| | | |
|---|---|---|
| 1,925,577 | Tillyer | Sept. 5, 1933 |
| 2,018,246 | Beard | Oct. 22, 1935 |
| 2,261,791 | Bokovoy | Nov. 4, 1941 |
| 2,626,363 | Holmbeck | Jan. 20, 1953 |